United States Patent [19]

Shigeki et al.

[11] Patent Number: 4,986,947
[45] Date of Patent: Jan. 22, 1991

[54] METHOD FOR CONNECTING ENDS OF WEATHER STRIPS

[75] Inventors: Kiyoshi Shigeki, Fukuroi; Masahiro Nozaki, Ama, both of Japan

[73] Assignee: Toyoda Gosei Co., Ltd., Nishikasugai, Japan

[21] Appl. No.: 511,409

[22] Filed: Apr. 19, 1990

[30] Foreign Application Priority Data

Jun. 29, 1989 [JP] Japan .................................. 1-167830

[51] Int. Cl.$^5$ ...................... B29C 41/40; B29C 41/20
[52] U.S. Cl. .................................. 264/250; 264/262; 425/123
[58] Field of Search ............... 264/438, 148, 152, 248, 264/250, 252, 261, 262, 263; 425/123

[56] References Cited

U.S. PATENT DOCUMENTS 3,030,246  4/1962  Westlake, Jr. ........................ 264/152

FOREIGN PATENT DOCUMENTS 2129365  5/1984  United Kingdom ................. 264/263

Primary Examiner—Jan H. Silbaugh
Assistant Examiner—Brian Jones
Attorney, Agent, or Firm—Cushman, Darby & Cushman

[57] ABSTRACT

A method for connecting ends of a weather strip made of a rubber material and composed of a base portion and a tubular sealing portion having two chambers which are separated by a rib, includes the steps of inserting each of both ends of a core, which have such a cross-sectional shape as to fill an outward chamber of the two chambers of the tubular sealing portion and press the rib on the base portion, into the outward chamber of each of the ends of the weather strip so that the ends of the weather strip are coupled by the core, the ends of the weather strip, which are coupled by the core are set within a cavity of a mold, a rubber material is poured into the cavity, and the core is removed from the ends of the weather strip after molding.

4 Claims, 4 Drawing Sheets

METHOD FOR CONNECTING ENDS OF WEATHER STRIPS

BACKGROUND OF THE INVENTION

1. Field of the Invention

The present invention relates to a method for connecting weather strips, and more particularly to a method for connecting opposed ends of weather strips.

2. Description of the Prior Art

Weather strips are mounted around openings of a vehicle body and around doors or the like closing these openings.

As shown in FIG. 8, each of the above-described weather strips is generally composed of a base portion 1 having a U-shaped cross section, and a tubular sealing portion 2 projecting from the base portion 1, and is integrally formed by extruding an elastic material such as a rubber material and a synthetic resin material. In order to connect the weather strip like a ring, the ends of the weather strip are set within a cavity of a mold in opposing relationship with a core inserted therein, and then an elastic material such as a rubber material and a synthetic resin material is poured into the cavity of the mold to form a molded connecting portion(Japanese unexamined Utility Model publication No. Sho59-169929).

Recently, the size of the tubular sealing portion tends to be increased. In order to maintain good shape-retentivity and improve the sealing performance of the large-sized tubular sealing portion 2, as shown in FIG. 9, a rib 21 has been formed within the tubular sealing portion 2. This result in the interior thereof being divided into two chambers on the side of a base portion 1 and on the side of a top end of the sealing portion 2(Japanese examined Utility Model publication No. Sho 52-50497).

SUMMARY OF THE INVENTION

Normally, the sealing portion of the connecting portion is formed by molding to have a cross sectional shape equal to that of the extruded weather strip. In the weather strip having the above-described divided sealing portion, the rib must be formed in the molded connecting portion so as to divide the sealing portion into two chambers. In order to mold the connecting portion having two chambers, two cores must be used, and the works for inserting these cores and removing them from the molded connecting portion are troublesome thereby lowering the productivity.

It is an object of the present invention to provide a method for connecting ends of extruded weather strip or strips, each having a divided tubular sealing portion, by a molded connecting portion with improved workability and productivity.

The present inventors have directed their attention to the fact that the molded connecting portion for connecting ends of the extruded weather strip or strips, which are opposed to each other at a short distance is of a short length. Accordingly, even if the tubular sealing portion of the molded connecting portion has no rib, the shape-retentivity and sealing performance of the tubular sealing portion of the molded connecting portion is hardly reduced. Consequently, the inventors have made the present invention.

In accordance with the present invention, in order to mold the connecting portion of the weather strip or strips, each being made of an elastic material such as a rubber material and a synthetic resin material, and having a base portion and a tubular sealing portion composed of two chambers on the side of the base portion with one chamber on the top end of the tubular sealing portion, the chambers being divided by a rib, ends of the weather strip or strips are coupled by a single core, both ends of which are inserted the chamber on the top end of the tubular sealing portion of each of the ends of the weather strip or strips, said core having such a cross-sectional shape that each of the both ends of the single core fills the chamber on the top end of the sealing portion, and presses the rib on the base portion, the ends of the weather strips, which are coupled by the single core are set within a cavity of a mold, an elastic material such as a rubber material and a synthetic resin material is poured into the cavity to mold the connecting portion between the ends of the weather strip or strips, and the single core is removed from the ends of the weather strip after molding.

The method of the present invention can be applied to both the case where two weather strips are connected to each other, and the case where a single weather strip is connected like a ring.

The single core used in the method of the present invention reduces production cost, and the workability in connecting ends of the weather strip or strips is improved whereby the productivity is improved.

There is no rib in the tubular sealing portion of the molded connecting portion. But, since the length of the molded connecting portion is short, the shape-retentivity and sealing performance thereof are not lowered.

BRIEF DESCRIPTION OF THE DRAWINGS

FIG. 1 is a front view of a door opening of a motor vehicle, along which a weather strip is attached;

FIG. 2 is a cross-sectional view taken along the line II—II of FIG. 1;

FIG. 3 is a view showing the state of the weather strip which is connected like a ring by molding:

FIG. 4 is a cross-sectional view of a molded connecting portion taken along the line IV—IV of FIG. 3;

FIG. 5 is a view showing the construction of the interior of the molded connecting portion, and a core used for molding the connecting portion;

FIG. 6 is a cross-sectional view of a weather strip;

FIG. 7 is a cross-sectional view of a molded connecting portion of the weather strip of FIG. 6;

DETAILED DESCRIPTION OF THE EMBODIMENTS

Figure 1:
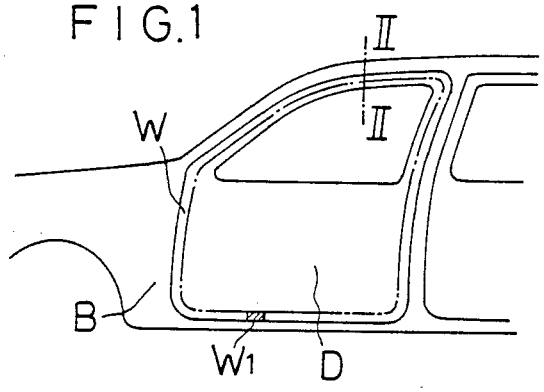
FIGS. 1 through 5 illustrate a first embodiment of a method in accordance with the present invention.
Figure 2:
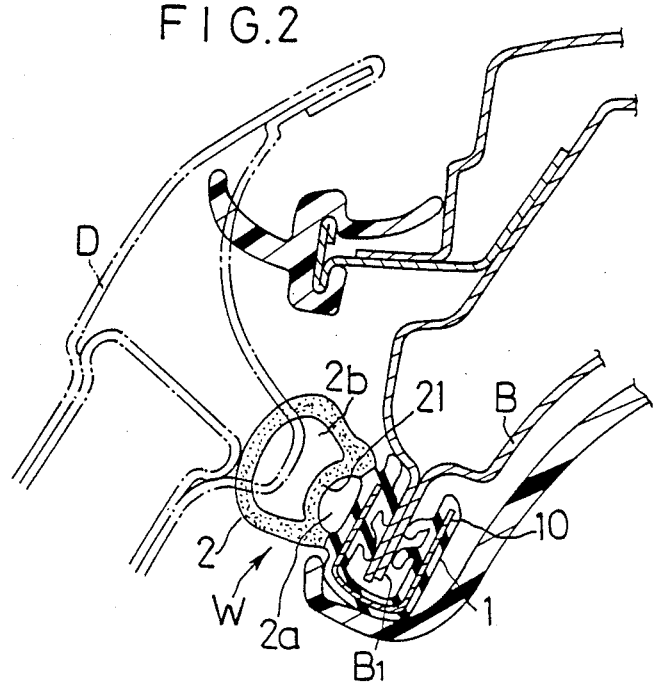

As shown in FIG. 1, a weather strip W is attached around a door opening of a body B of a motor vehicle. As shown in FIG. 2, the weather strip W is composed of a base portion 1 having a U-shaped cross section, and a tubular sealing portion 2 having a nearly circular cross section. Within the base portion 1 is embedded a metallic insert 10. The base portion 1 is mounted on a flange B1 formed around the door opening, and the tubular sealing portion 2 projects from one of side walls of the base portion 1, and comes into contact with an inner surface of a door frame of a door D thereby effecting a seal. Within the tubular sealing portion 2 is formed a rib 21 so as to cross the interior of the tubular sealing portion 2 thereby dividing the interior of the tubular sealing portion 2 into a first chamber 2a on the side of the base portion 1, and a second chamber 2b on the side of a top end of the sealing portion 2. The base portion 1 is made of solid rubber while the tubular sealing portion 2 is made of sponge rubber, and they are integrally formed by extrusion. In order to attach the weather strip W around the door opening, both ends of the weather strip W are connected to each other by a connecting portion W1 at a position corresponding to the bottom of the door opening as shown in FIG. 1.

Figure 3:
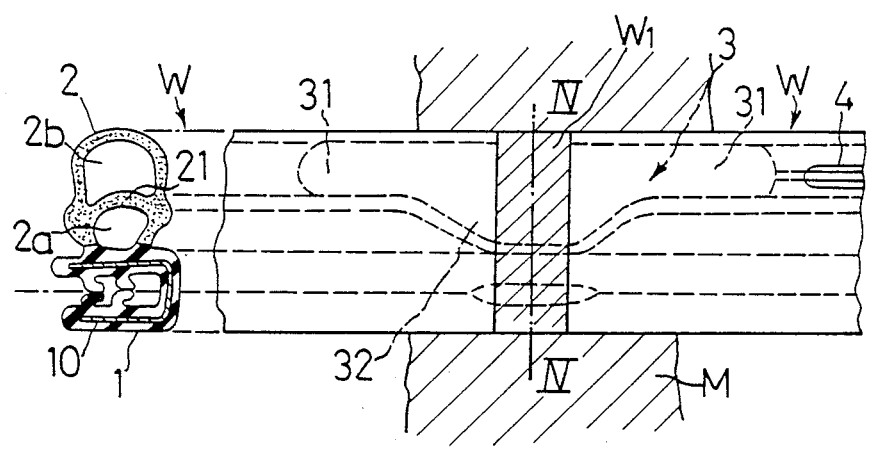

The method for connecting the weather strip W will be explained with reference to FIGS. 3 through 5.

Both ends of the extruded weather strip W are opposed to each other at a short distance, and are coupled by a single core 3 of a rodlike shape. This coupling is performed by inserting the core 3 into the second chamber 2b from a hole 4 formed in one end of the weather strip W, and then, the core 3 is inserted into the second chamber 2b of the other end of the weather strip W.

Figure 5:
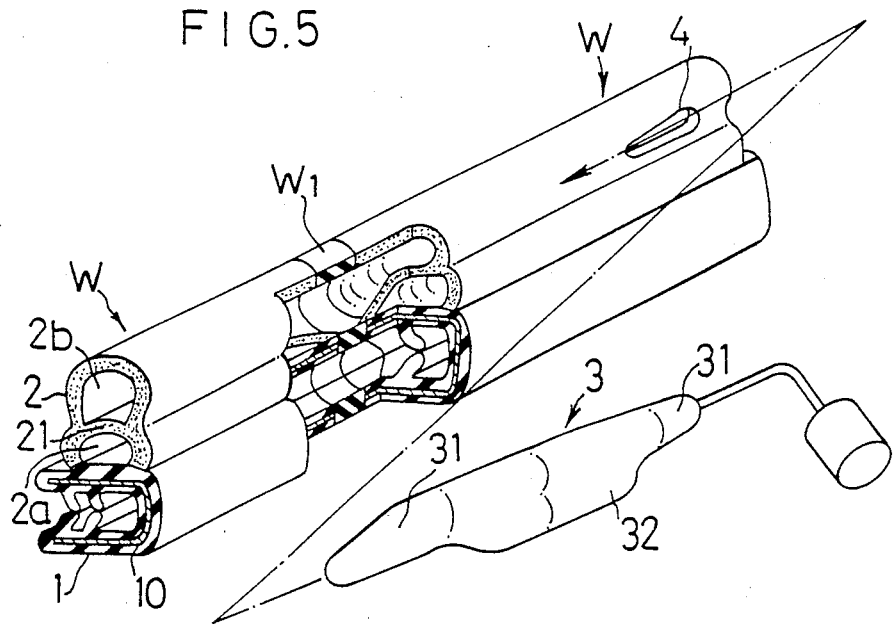

As shown in FIG. 5, both ends 31 of the core 3 have a cross-sectional shape equal to or smaller than that of the second chamber 2b. The central portion 32 of the core 3 has a cross-sectional shape equal to that of the overall sealing portion 2 including the first and second chambers 2a and 2b. The lower surface of the core 3 is tapered from each end 31 to the central portion 32 so that the cross-sectional shape is gradually enlarged downwardly from each end 31 to the central portion 32. As shown in FIGS. 3 and 5, both ends 31 and the tapered portions except for the central portion 32 are inserted into the second chambers 2b thereby pressing the rib 21 on the base portion 1.

Both ends of the weather strip W which are coupled by the core 3 are set within a cavity of a mold M, and a rubber material is poured thereinto thereby molding the connecting portion W1. Solid rubber material slightly softer than that of the base portion is used as the rubber material for the connecting portion W1. After the molding process, the core 3 is removed from the hole 4.

Figure 4:
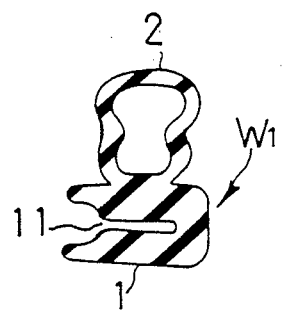

FIG. 4 shows the cross-sectional shape of the obtained molded connecting portion W1. The tubular sealing portion 2 is molded around the central portion 32 of the core 3 by which the rib 21 is pressed on the base portion 1. Due to the press of the rib 21, both ends to the first chamber 2a(FIG. 3) are closed so that the rubber material is prevented from intruding into the first chamber 2a during the molding process. The base portion 1 of the molded connecting portion W1 has a groove 11 into which the flange B1(FIG. 2) is inserted.

As described above, in accordance with the method of the present invention, only a single core is used so that the works for inserting and removing the core, which have conventionally obstructed the improvement of workability, can be simplified to greatly improve the productivity.

The sealing portion of the molded connecting portion has no rib, but the shape-retentivity and the sealing performance of the sealing portion are hardly lowered for the length of the molded connecting portion is short.

The method of the present invention is not limited to the connection of the weather strip or strips to be attached around the door opening of the motor vehicle. The method of the present invention can be applied to the connection of the weather strip or strips to be attached to another place.

Figure 6:
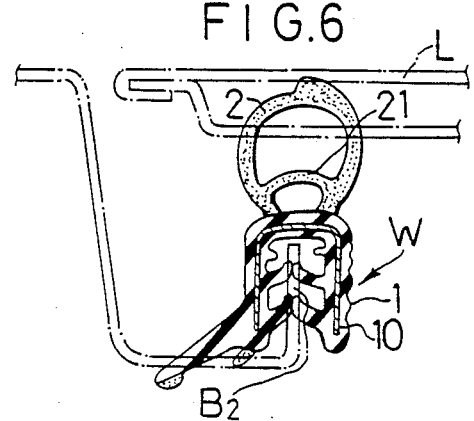
FIGS. 6 and 7 illustrate a second embodiment of a method in accordance with the present invention.

FIG. 6 illustrates an extruded weather strip to be attached around a luggage compartment of a motor vehicle. A base portion 1 having a U shaped cross section, within which a metallic insert 10 is embedded, is mounted on a flange B2 formed along an opening edge of the luggage compartment. A tubular sealing portion 2 is formed on a top wall of the base portion 1, and has a rib 21 dividing the interior of the tubular sealing portion 2 into two chambers on the side of its top end, and on the side of the base portion 1. When a luggage door L is closed, the tubular sealing portion 2 is pressed on the base portion 1 by the luggage door L.

Figure 7:
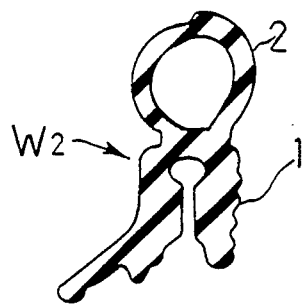
Figure 8:
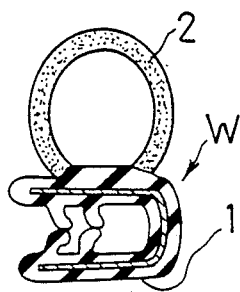
FIG. 8 is a cross-sectional view of a conventional weather strip having no rib in its sealing portion.
Figure 9:
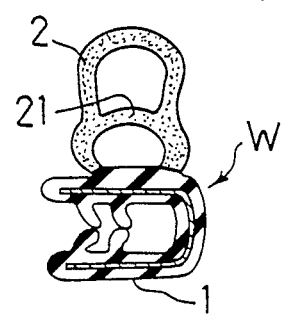
FIG. 9 is a cross-sectional view of a conventional weather strip having a rib in its sealing portion.

FIG. 7 illustrates a connecting portion W2 of the weather strip W for the luggage compartment. The connecting portion W2 is molded by using a single core in a similar manner to the preceding embodiment shown in FIGS. 1 through 5 thereby having no rib.

What is claimed is:

1. A method for connecting ends of weather strips, each being made of an elastic material, and having a base portion and a tubular sealing portion projecting from the base portion, the sealing portion having a rib for dividing an interior of the tubular sealing portion into a first chamber on the side of the base portion, and a second chamber on the side of a top end of the tubular sealing portion, comprising the steps of:
   coupling the ends of the weather strips by a single core in opposing relationship, both ends of said single core being inserted into the second chambers of the ends of the weather strips, respectively, said core having such a cross-sectional shape that each of said both ends of said single core fills the second chamber, and that said single core presses the rib against the base portion;
   setting the ends of the weather strips, which are coupled by said single core, within a cavity of a mold;
   pouring an elastic material into said cavity to mold a connecting portion between the ends of the weather strips; and
   removing said single core from the second chambers of the weather strips after molding.

2. A method according to claim 1, wherein the base portion has a U-shaped cross section, the tubular sealing portion is formed on the base portion, and has a nearly circular cross section, and the rib crosses the interior of the tubular sealing portion so as to divide the interior of the tubular sealing portion into two chambers on the side of a top end of the sealing portion and on the side of the base portion.

3. A method according to claim 1, wherein the base portion is made of solid rubber, the tubular sealing portion having the rib is made of sponge rubber, each of the weather strips is integrally formed by extrusion, and said elastic material for said connecting portion is made of solid rubber slightly softer than said solid rubber of said base portion.

4. A method according to claim 1, wherein said single core is of a rodlike shape, each of said both ends of said both ends of said single core has a cross-sectional shape equal to or smaller than that of the second chamber, a central portion of said single core has a cross sectional shape substantially equal to that of the sealing portion, the cross sectional shape of said core is gradually enlarged downwardly from said both ends to said central portion, and said core is inserted into the second chambers of the ends of the weather strips except for said central portion of said single core.

* * * * *